(12) United States Patent
Hélot

(10) Patent No.: US 10,493,816 B2
(45) Date of Patent: Dec. 3, 2019

(54) CONTROL DEVICE FOR A COMFORT SYSTEM OF A MOTOR VEHICLE, COMFORT SYSTEM HAVING A CONTROL DEVICE, AND MOTOR VEHICLE HAVING A COMFORT SYSTEM

(71) Applicant: AUDI AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/329,629

(22) PCT Filed: Aug. 9, 2017

(86) PCT No.: PCT/EP2017/070233
§ 371 (c)(1),
(2) Date: Feb. 28, 2019

(87) PCT Pub. No.: WO2018/041573
PCT Pub. Date: Mar. 8, 2018

(65) Prior Publication Data
US 2019/0193509 A1    Jun. 27, 2019

(30) Foreign Application Priority Data

Sep. 1, 2016  (DE) .................. 10 2016 216 543

(51) Int. Cl.
| | | |
|---|---|---|
| *B60H 1/00* | (2006.01) | |
| *B60K 35/00* | (2006.01) | |
| *B60K 37/06* | (2006.01) | |
| *B60H 1/34* | (2006.01) | |
| *B60K 37/00* | (2006.01) | |

(52) U.S. Cl.
CPC ....... *B60H 1/0065* (2013.01); *B60H 1/00985* (2013.01); *B60H 1/34* (2013.01); *B60K 35/00* (2013.01); *B60K 37/06* (2013.01); *B60K 2370/122* (2019.05); *B60K 2370/143* (2019.05);

(Continued)

(58) Field of Classification Search
None
See application file for complete search history.

(56) References Cited

U.S. PATENT DOCUMENTS

2014/0055397 A1* 2/2014 Becker .................. B60K 35/00
                                                          345/173
2015/0314683 A1* 11/2015 Toggweiler ............ B60K 37/02
                                                          345/173

(Continued)

FOREIGN PATENT DOCUMENTS

DE        103 52 044 A1    6/2005
DE  10 2011 010 229 A1     8/2012

(Continued)

OTHER PUBLICATIONS

International Search Report for PCT/EP2017/070233 dated Oct. 24, 2017.

(Continued)

*Primary Examiner* — Jelani A Smith
*Assistant Examiner* — Kelly D Williams
(74) *Attorney, Agent, or Firm* — Staas & Halsey LLP

(57) ABSTRACT

A touch sensitive screen is provided as a frame element for a component of a comfort system of a motor vehicle, to wholly or partly frame the component.

15 Claims, 4 Drawing Sheets

(52) U.S. Cl.
CPC .. *B60K 2370/145* (2019.05); *B60K 2370/658* (2019.05)

(56) References Cited

U.S. PATENT DOCUMENTS

2015/0339025 A1* 11/2015 Yamamoto .............. G06F 3/044
                    715/784
2016/0176264 A1   6/2016 Jablonski

FOREIGN PATENT DOCUMENTS

| | | |
|---|---|---|
| DE | 10 2015 004 062 A1 | 8/2015 |
| DE | 10 2014 014 118 A1 | 3/2016 |
| DE | 10 2015 005 126 B3 | 6/2016 |
| DE | 102016216543.7 | 9/2016 |
| EP | 2 208 645 A1 | 7/2010 |
| EP | 2 891 955 A1 | 7/2015 |
| FR | 3 028 810 A1 | 5/2016 |
| WO | 2009/089092 A1 | 7/2009 |
| WO | PCT/EP2017/070233 | 8/2017 |

OTHER PUBLICATIONS

English translation by WIPO of the International Preliminary Report on Patentability for International Application No. PCT/EP2017/070233 dated Mar. 7, 2019.

\* cited by examiner

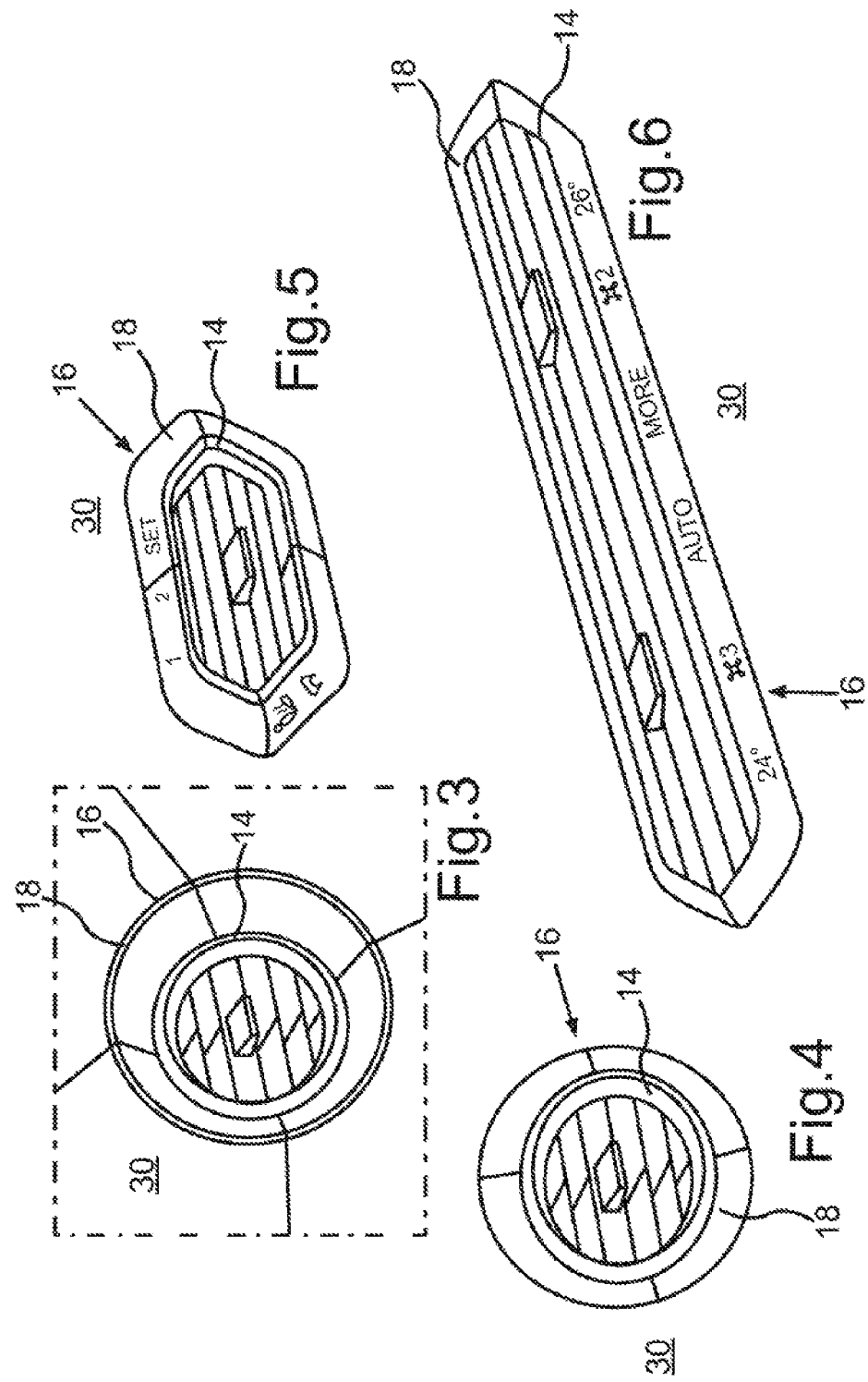

CONTROL DEVICE FOR A COMFORT SYSTEM OF A MOTOR VEHICLE, COMFORT SYSTEM HAVING A CONTROL DEVICE, AND MOTOR VEHICLE HAVING A COMFORT SYSTEM

CROSS REFERENCE TO RELATED APPLICATIONS

This application is the U.S. national stage of International Application No. PCT/EP2017/070233, filed Aug. 9, 2017, and claims the benefit thereof. The International Application claims the benefit of German Application No. 10 2016 216 543.7 filed on Sep. 1, 2016, both applications are incorporated by reference herein in their entirety.

BACKGROUND

Described herein is an operator control device for a comfort system of a motor vehicle, wherein the operator control device has a touch-sensitive screen having a control panel. An operator control device is in this case an appliance component or assembly set up for receiving an operator control action of a user and for generating an operator control signal describing the received operator control action. A comfort system is subsequently understood to mean an appliance of the motor vehicle that utilizes comfort technology, for example ventilation, heating, air conditioning, an antitheft system, a window lifter, a door opener, a canopy operating system, a device for adjusting a motor vehicle seat, an exterior mirror, a driver assistance system or an infotainment system.

For the operator control of such comfort systems, there are screens ("displays") that can be bent in one direction, that is to say have a cylindrical form in this instance, for example. Such operator control screens have always been separate to date, however, and are not related to the appliance to be controlled.

DE 10 2015 005 126 B3 discloses an operator control element for controlling an air conditioning system of a vehicle, wherein the outflow volume is adjusted by a touch-sensitive operating panel of the operator control element. To this end, the operator control element has a slide control function. The operator control part and the control panel of the operator control element are arranged beside an air nozzle.

FR 3 028 810 A1 describes an outlet nozzle for an air conditioning system of a vehicle, in the case of which a touch sensitive screen is likewise arranged on the outlet nozzle. The display is in this case mounted on one of the lamellae of the outlet nozzle.

DE 10 2015 004 062 A1 describes an air supply device in the motor vehicle, one of the lamellae being able to have a slide control function. The lamella can have a touch-sensitive surface in this case.

The operator control devices from the related art either do not solve the above disadvantages or require a lamella to be touched, in which case the user can inadvertently change a lamella position by too much pressure.

SUMMARY

Described below is an installation-space-saving operator control device that prevents incorrect operation of comfort system.

By configuring the screen as a frame and arranging all or most of it around an assembly, installation space is saved and incorrect operation can be prevented almost completely.

The operator control device for a comfort system of a motor vehicle has a touch-sensitive screen having a control panel and the touch-sensitive screen is configured as a frame element for an assembly of the comfort system. The touch-sensitive screen is configured to frame all or at least some or most of the assembly. The assembly is, in other words, a different assembly than the screen. By way of example, the touch-sensitive screen can be configured as a strip-shaped and/or curved frame element.

One advantage is that a modern technology is combined with a modern design. The synergy between the screen and the assembly or between the screen and the comfort system results in improved ergonomics. Additionally, it is immediately apparent to a user what the function of the screen is. The operator control device additionally saves installation space and requires smaller dimensional chains. The reduction in the installation space required also results in an improved interior feeling for the user in the motor vehicle. In contrast to a confusing screen on which all possible functions of all or multiple comfort systems can be displayed and with which different comfort systems can be controlled, the operator control device is much clearer and facilitates fast control of the comfort system. Furthermore, the screen has a design function. The operator control device affects the user in the manner of a visual reduction of influences, which calms down an interior of the motor vehicle. The operator control device and the comfort system are usefully integrated into the interior of the motor vehicle.

The operator control device also allows better and faster operator control of the comfort system and promotes blind operation, in particular if haptically perceptible elements are arranged on the operator control device and/or the screen, for example shapes that the user's fingers can enclose.

The touch-sensitive screen can be configured, according to the further embodiment of the operator control device, as a volumetric screen ("volumetric display") or volume screen ("volume display") or as a screen having an alterable outer shape. A volumetric screen is in this case a stereo screen or a 3D screen, for example. A volume screen is a graphical display unit that allows a visual representation of an object in all three dimensions. A screen having an alterable outer shape is a screen that can alter its outer shape and hence the shape of the user interface, and can also be referred to as a "morphing" display.

A plastic representation of this kind for symbols, for example, that can represent a function of the comfort system allows the symbols to be displayed in easily visible form, in particular if for example the control panel is arranged obliquely in the motor vehicle as seen by the user.

According to an embodiment of the operator control device, the control panel can have a curved and/or domed surface and/or the screen can be configured as a ring display. A ring display is understood in this case to mean an annular screen or a screen forming a closed frame. In contrast to a flat, planar control panel, operator control can be effected more conveniently and more ergonomically, since for example the user can touch the control panel at a favorable angle or can feel for the control panel better on account of the curved and/or domed surface. This thus also improves blind operation of the comfort system. Additionally as the result of the better ergonomics, the operator control device is integrated more agreeably in terms of design aspects.

The above aforementioned advantages are likewise achieved by a comfort system for a motor vehicle. The comfort system has an operator control device according to one of the embodiments described above. In this case, the touch-sensitive screen frames all or most of the assembly of the comfort system. As already mentioned above, the touch-sensitive screen can be in strip-shaped configuration in this case and completely or partially formed around the assembly. In other words, the touch-sensitive screen can be arranged around the assembly in the form a curved strip.

A further embodiment of the comfort system provides for the assembly to be able to be an air nozzle or a door opener or a key bar or a roof module or a reading lamp. Such comfort systems are used by the user particularly frequently during a journey. The applicable comfort system can in this case be, by way of example, an air conditioning system, a ventilation system, an antitheft system, that is to say for example a locking system, or a mechanical operator control device, which can be a separate operator control device from the operator control device described herein.

In a further variant, the comfort system can be an electronic parking brake, a window lifter or a circuit, which are able to have a contour display in order to improve the display. The touch-sensitive screen can be for example an informative or decorative screen that can be arranged for example around a loudspeaker or a cup holder or a combination instrument, for example to display a temperature of the cup or a driving mode, for example a "drive select" mode, or to reproduce music using color.

If the assembly has at least one mechanical operator control element, for example a key or a key bar, arranged inside a frame formed by the frame element, and if a respective operator control area of the control panel is set up to assign an operator control function to the at least one mechanical operator control element, then a combination of the operator control device and the mechanical operator control elements can be provided in a very small installation space, these being able to be used to operate or control many functions of the comfort system. In a development, the assembly can have at least two mechanical operator control elements, and the respective operator control area of the operator control device can display the function triggerable by the mechanical operator control element. The touch-sensitive screen can then be set up to receive an operator control action for changing an association between a function to be triggered by the respective mechanical operator control element and the respective mechanical operator control element. By way of example, operator control areas, which can be arranged above the at least two mechanical operator control elements, can display which functions of the mechanical operator control elements can currently be activated. On the basis of a swipe gesture, for example, the at least two mechanical operator control elements can then be assigned other functions. This significantly increases the multiplicity of controllable functions of the comfort system.

A motor vehicle, which can be configured as a motor car, for example as an automobile an embodiment of the comfort system described herein and achieves the advantages already cited above.

According to a further embodiment of the motor vehicle, a side of an interior trim portion of the motor vehicle that faces an interior and an end face of the assembly of the comfort system that is visible to the user can be in two different planes, wherein the control panel of the operator control device connects the two planes. The two planes can lie parallel to one another. The interior trim portion can also be referred to as an interior trim element or an interior trim assembly. This embodiment advantageously results in the operator control device being able to be felt for haptically.

A hand of the user can reach into the operator control device or be introduced into the interior formed by the frame element. A hand or a finger of the user can be guided during operator control in this case, allowing blind operation even more.

In one development, the assembly can be retracted in the interior trim portion or can protrude from the interior trim portion. This amplifies the aforementioned effects.

The operator control device is explained again in more detail by specific exemplary embodiments with reference to the appended drawings. In the exemplary embodiments, the described components of the embodiments each constitute individual features of the operator control device that should be considered independently of one another and that each also develop the operator control device independently of one another and therefore should also be considered individually or in a combination other than the one shown as part of the operator control device. In addition, the described embodiments can also be supplemented by more of the previously described features of the operator control device.

BRIEF DESCRIPTION OF THE DRAWINGS

These and other aspects and advantages will become more apparent and more readily appreciated from the following description of the exemplary embodiments, taken in conjunction with the accompanying drawings. Elements having the same function have the same reference signs in the figures, in which:

FIGS. 3-8 are perspective views of respective further embodiments of the operator control device.

DETAILED DESCRIPTION OF THE PREFERRED EMBODIMENT

Figure 1:
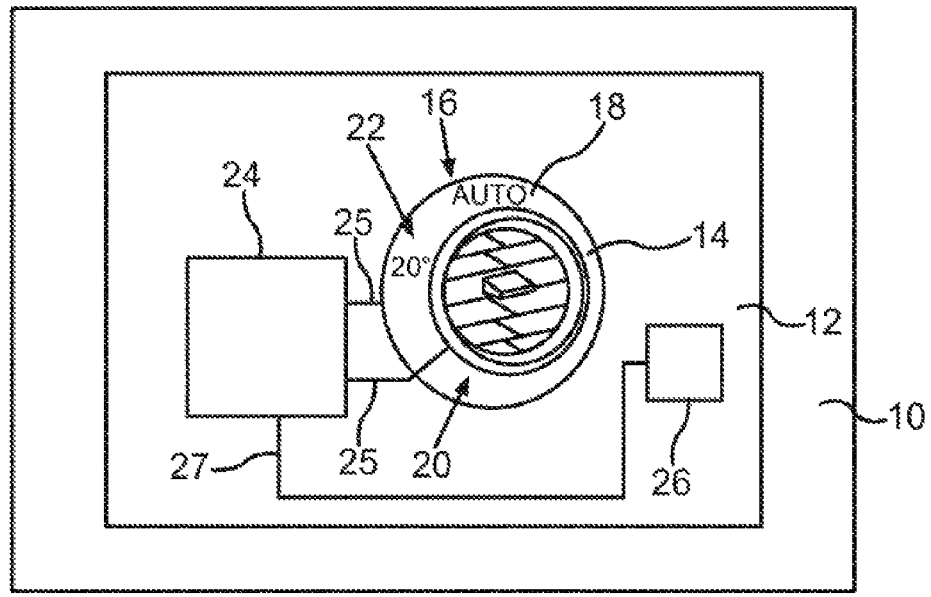
FIG. 1 is a schematic outline for a first embodiment of the operator control device of the comfort system and of the motor vehicle

FIG. 1 schematically illustrates the principle of the operator control device in a motor vehicle 10, for example an automobile, that has a comfort system 12. The comfort system 12 can be a ventilation system of the motor vehicle in the example of FIG. 1. The motor vehicle 10 can alternatively or additionally have a comfort system 12 that can be configured as an air conditioning system, antitheft system or electric window lifter, for example. The comfort system 12 has an assembly 14, which can be configured as an air nozzle in the example of FIG. 1.

FIG. 1 likewise shows an operator control device 16 that has a touch-sensitive screen 18. The touch-sensitive screen 18 has a control panel 20 on which, by way of example, multiple symbols 22 can be presented. These symbols 22 can be a temperature indication ("20° C.") or a ventilation symbol or an automatic function ("auto"), for example.

The touch-sensitive screen 18 can in this case be provided by a technology known to the person skilled in the art for producing a flexible display, for example. The touch-sensitive screen 18 can have pixels with a driver for each pixel. What is known as a "chip on the display", that is to say a microchip or microcontroller on the screen, is known to a person skilled in the art from the related art.

The touch-sensitive screen 18 can be configured for example as what is known as an "OLED" ("organic light-emitting diode screen") display or as a screen with thin-film transistor actuation ("thin-film transistor display", "TFT"). Alternatively, a mirror system or a plurality of OLEDs arranged in succession is possible, for example.

Alternatively, the screen 18 can also be configured as a volumetric screen or volume screen. Technologies are known to a person skilled in the art for providing a volumetric display or volume display from the related art. In this regard, for example points of light can be described and represented in space, for example by luminous voxels in gas, haze or on a quickly rotating frosted glass pane or helix. Alternatively, multiple liquid crystal displays can be used in this case, for example.

Screens (18) having an alterable shape are known to a person skilled in the art from the related art and can be constructed for example from six-sided display cubes that are interlinked and can be moved individually or in grouped fashion in order to change the configuration of the display surface and thus to provide a rugged or stepped user interface, for example.

The screen 18 can be clipped or adhesively bonded to an end face of the comfort system 12 during installation, for example. FIG. 1 shows an optional control device 24 of the comfort system 12, that is to say a device of the comfort system 12 that is configured for generating control signals and hence for operating and controlling the comfort system 12 and, by way of example, can have a microchip or microprocessor. This control device 24 can be connected to the screen 18 and to the assembly 14 via a signal transmission connection 25.

FIG. 1 likewise shows an optional power supply 26, which can have a battery, for example. This power supply 26 can then be connected to a control circuit board of the control device 24 by physical wiring 27, for example. Such a power supply 26 can be used to operate the comfort system 12 even when an ignition of the motor vehicle 10 is currently switched off.

The operator control device 16 can optionally have dedicated control electronics, for example, and/or retaining elements or latching elements, for example, that is to say for example hooks or eyes for mounting the operator control device 16. The exemplary control electronics and the exemplary latching elements are not shown in FIG. 1. Optionally, the operator control device 16 can also have a housing, for example, which is likewise not shown in FIG. 1.

Figure 2:
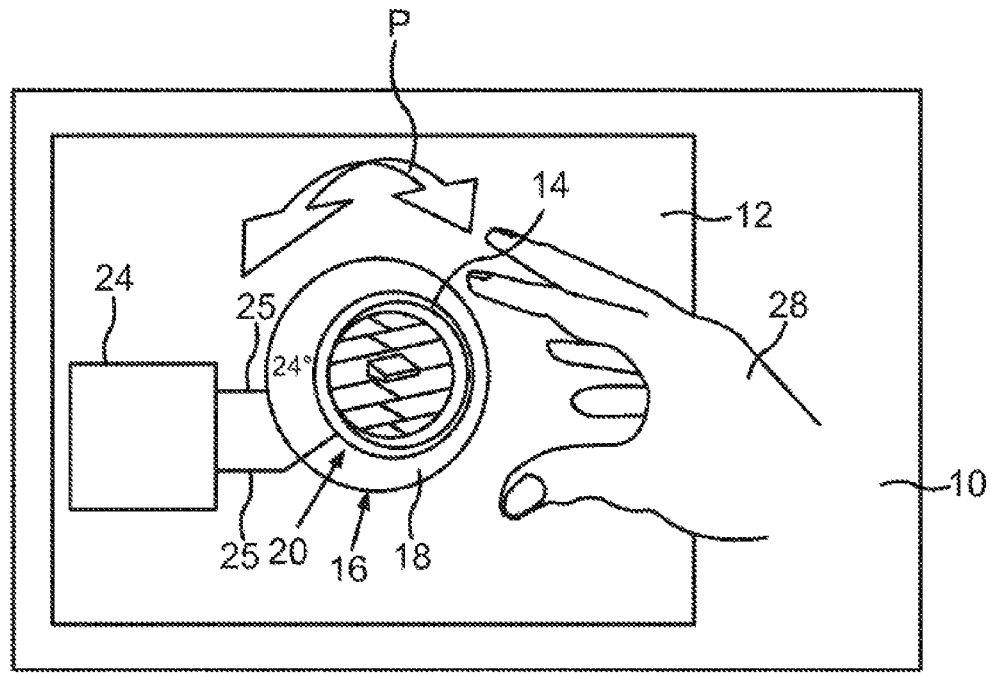
FIG. 2 is a schematic outline for a further embodiment of the operator control apparatus of the comfort system and of the motor vehicle.

The example in FIG. 2 can be a corresponding example, as already described above in regard to FIG. 1, only the differences being discussed below. FIG. 2 shows an exemplary embodiment in which a user 28 is currently touching the touch-sensitive screen 18 with his hand. The operator control action, for example rotating the operator control device 16 or circularly swiping over the control panel 20, is denoted by the arrow P. The operator control device 16 can be mounted rotatably around the assembly 14, for example, so that the user 28 can grip and rotate the operator control device 16. For the exemplary swipe gesture, the user 28 can sweep his finger over the control panel 20, for example, and in this way set a different temperature, for example. The screen 18 can be mounted statically or rotatably, for example, for better ergonomics and, by way of example, can be configured such that haptic feedback can be provided during operator control.

In the example of FIGS. 1 and 2, the operator control device 16 and/or the screen 18 can be configured in bent and round fashion. In other words, the operator control device 16 and/or the screen 18 can be arranged as a bent, round strip around the assembly 14. In this case, a plane in which an end face of the assembly 14 can lie can be parallel to a plane of the interior trim portion (not shown in FIG. 1 and FIG. 2), for example, so that the screen 18 arranged on the assembly 14 can be domed toward the user.

Figure 9:
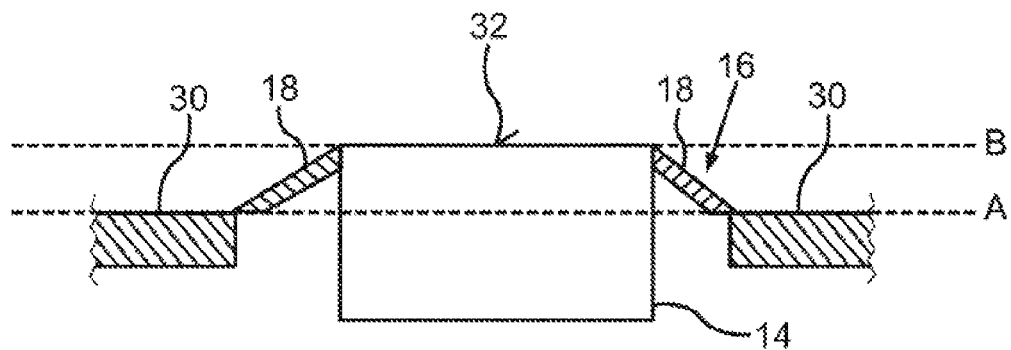
FIGS. 9 and 10 are schematic cross sections illustrating respective further embodiments of the operator control device.

Such an operator control device is shown again by way of example in FIG. 9 in cross section. FIG. 9 shows the plane A of an interior trim portion 30, for example a trim portion of a dashboard of the motor vehicle 10, and a plane B in which the end face 32 of the assembly 14 can lie. In the example of FIG. 9, the planes A and B are shown parallel to one another by way of example in this case.

FIG. 3 shows an example of an operator control device 16 in which the assembly 14 can be recessed in the interior trim portion 30, for example. The screen 18 and/or the operator control device 16 can again be configured as a round strip, by way of example, in this case, these being domed inward in the case of FIG. 3. For reasons of clarity, FIG. 3, like FIGS. 4 to 8 below too, has dispensed with depicting the individual components of the comfort system 12 and the motor vehicle 10. The operator control devices 16 shown in FIGS. 3 to 8 are thus exemplary embodiments that can be combined with the motor vehicle 10.

Figure 10:
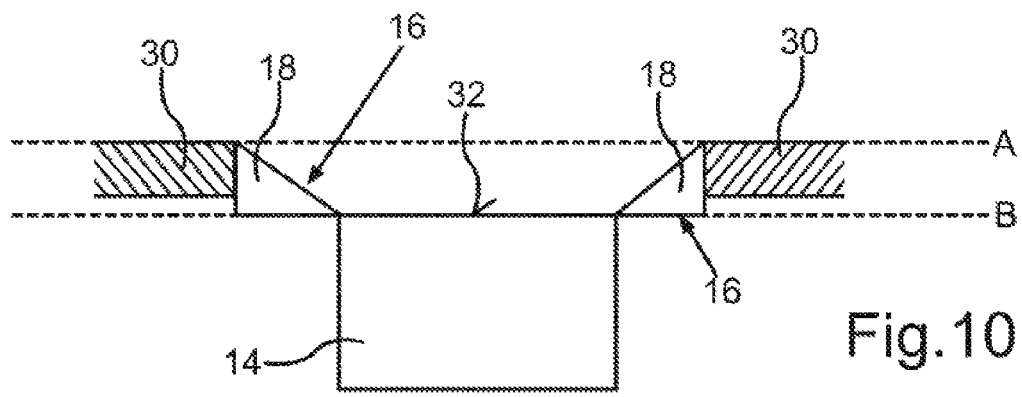

FIG. 10 uses a cross section to once again show an assembly 14, shown in FIG. 3, recessed in the interior trim portion 30, as a result of which the plane B of the end face 32 of the assembly 14 is again depicted parallel to the plane A of the interior trim portion 30 by way of example.

FIG. 4 shows an operator control device 16 that, as in FIGS. 1 to 3, can be configured as a round strip, and can be arranged around an air nozzle as assembly 14 by way of example. In the example of FIG. 4, the end face of the assembly 14 can lie in the same plane as the plane A of the interior trim portion 30, and the operator control device 16 and the screen 18 can be configured in round and flat fashion.

The exemplary operator control devices 16 of FIGS. 1 to 4 can be configured for example as a ring touch display around an air nozzle, the exemplary screen 18 being able to be configured to be rotatable or operable, for example, in two directions. Such an operator control device 16 can be arranged for example on a roof module, for example for operating a sliding roof or a luminaire, and can provide for example additional functions such as sending an emergency call or calling a traffic club.

FIG. 5 shows an operator control device 16 having a screen 18 whose form can be matched to the contours to the exemplary air nozzle. In the case of FIG. 5, this screen can thus be configured as a sharply angled strip.

The assembly 14 of FIG. 6 is by way of example a wideband nozzle of an air conditioning system, and accordingly the screen 18 can be configured as a wide frame that can be bent sharply at the ends.

Figure 7:
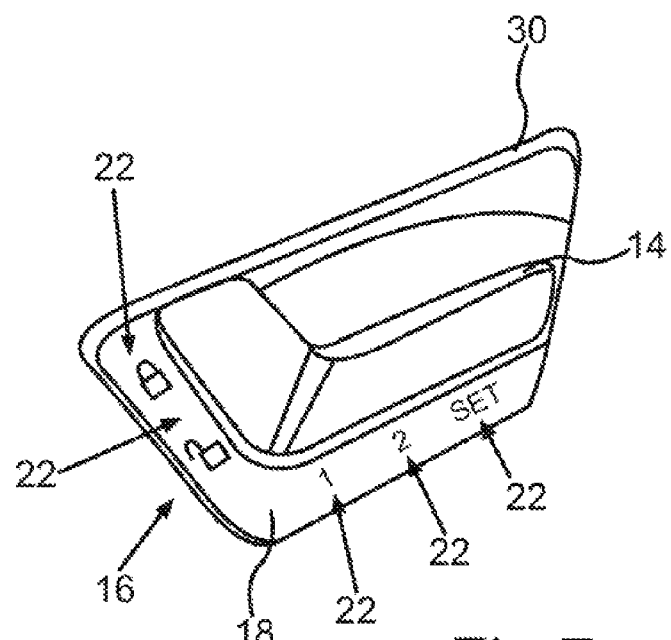

By way of example, FIG. 7 shows a band touch display bent in two directions as a screen 18 around a door opener as assembly 14. In this case, the screen 18 does not border the assembly 14 completely. According to the example of FIG. 7, the screen 18 can be configured as an L-shaped strip and can display possible functions for operating the exemplary door opener. Depicted by way of example by a symbol 22 of a closed lock, the operator control device 16 can display a function for locking the motor vehicle, or, by the symbol 22 representing an open lock, opening the motor vehicle, such as for example functions for selecting preset seat positions of a motor vehicle seat ("1", "2") and/or a "SET" function for programming a third preset seat position.

Figure 8:
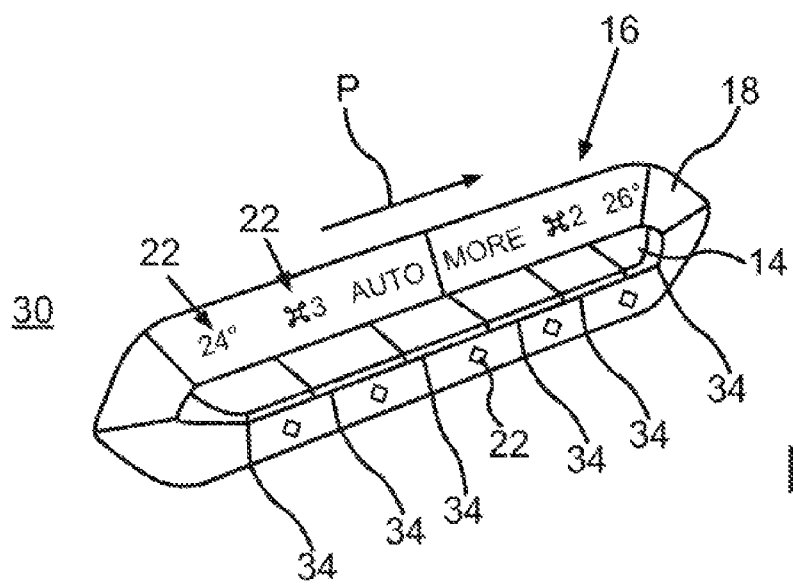

In the example of FIG. 8, an operator control device 16 is shown, the screen 18 of which can be configured as a wide band or as a wide strip. The screen 18 can be arranged for example as a volumetric display or volume display around a key bar as assembly 14, the exemplary key bar being able to have multiple mechanical rocker keys 34. Above each rocker key 34, a symbol 22 can be displayed on the screen 18. For reasons of clarity, no all symbols 22 are provided with reference signs. The symbols 22 that can be displayed above each mechanical rocker key 34 can each display for example that function that can be associated with the rocker key 34 that is accordingly beneath. By way of example, the left-hand rocker key 34 can initiate adjustment of a temperature to 24 degrees Celsius. Additionally, the display 18 can also display beneath each rocker key 34 a respective symbol 22, which can describe a function currently not associated with the respective rocker key 34, however. If the user 28 (not shown in FIG. 8) sweeps over the screen 18 in the direction P, for example, then the applicable symbols 22 can be moved in the direction P. As a result, the user 28 can for example sweep until those functions that he now wants to operate using the rocker keys 34 can be positioned above the rocker key 34.

Alternatively, there can for example be provision for the functions to change as soon as the motor vehicle 10 is started. In this way, the rocker keys 34 can be assigned functions that can be useful during the journey, for example.

Alternatively, there can be provision for the screen 18 in the example of FIG. 8 to be able to adopt only an artistic function, but to be able to be operated using the rocker keys 34. In a further variant, for example a jukebox or a massage function can be displayed above the rocker keys 34 during a piloted procedure of the motor vehicle 10.

The above exemplary embodiments illustrate the principle of the invention, to provide a contour display on an assembly 14, for example on a physical object or, by way of example, on an interface element.

According to a further exemplary embodiment, a screen 18 or screens 18 is/are arranged around the assembly 14, for example around a physical object or an interface element. The screen 18 or the screens 18 can in this case follow a contour of the element, that is to say the contour of the assembly 14, accurately. Between the screen 18 and the assembly 14, there can be an interaction, for example a ring display around an air nozzle can be set up to operate an air conditioning function.

According to a further exemplary embodiment, for example a display driver can be on the screen 18 directly.

According to further exemplary embodiments, the screen 18 can be configured for example as a screen of a multimedia interface ("MMI") around an air nozzle, for example as a morphing display, that is to say as a screen that can change shape, or as a static display. Alternatively, for example, the screen 18 can be configured as a ring display around a cup holder or a fuel cap or a charging cap of an electric motor vehicle, the screen 18 being able to display a temperature or a cooling state of an inserted cup or a remaining charging time, for example. To this end, the operator control device can be connected to an appropriate sensor of the cup holder or of the tank, for example.

According to further exemplary embodiments, the screen 18 can be arranged for example around a door handle on an outside of the motor vehicle 10 or can be configured as a ring display, that is to say as an annular screen 18, around a roof module or a reading lamp and for example for operating the roof module and/or the reading lamp and/or for lighting.

If the screen 18 is arranged for example as a ring display around a window lifter system, the screen 18 can for example display which windows can be operated with individual window lifters. An exemplary ring display around an electric parking brake can indicate a status or a present setting of the parking brake, for example.

According to further exemplary embodiments, the screen 18 can be arranged for example annularly or as a closed frame around or on a handle of a gear lever or around a shift-by-wire system and for example can indicate a currently selected gear or all available gear selections. If the screen 18 is arranged around a main display of a combination instrument, for example, the screen 18 can display a temperature gauge, a fuel gauge, a range indicator, a driving mode (for example "sport" or "comfort") or a warning lamp, for example.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A comfort system for a motor vehicle, comprising:
   an assembly having at least two mechanical operator control elements; and
   an operator control device for the comfort system, including a touch-sensitive screen having a control panel, the touch-sensitive screen being configured as a frame element surrounding at least most of the assembly, the control panel configured with an operator control area assigning an operator control function to at least one of the at least two mechanical operator control elements, the operator control area displaying a function triggerable by a respective mechanical operator control element, and the touch-sensitive screen configured to receive an operator control action for changing an association between the function and the respective mechanical operator control element to another function triggerable by the respective mechanical operator control element and the respective mechanical operator control element.

2. The comfort system as claimed in claim 1, wherein the assembly is a key bar.

3. The comfort system as claimed in claim 2, wherein the touch-sensitive screen is configured as a volumetric screen and/or volume screen and/or as a screen having an alterable shape and/or has a curved and/or domed surface.

4. The comfort system as claimed in claim 3, wherein the touch-sensitive screen is configured as a ring display.

5. The comfort system as claimed in claim 2, wherein the touch-sensitive screen is configured as a ring display.

6. The comfort system as claimed in claim 1, wherein the touch-sensitive screen is configured as a volumetric screen and/or volume screen and/or as a screen having an alterable shape and/or has a curved and/or domed surface.

7. The comfort system as claimed in claim 1, wherein the touch-sensitive screen is configured as a ring display.

8. A motor vehicle, comprising:
   an interior trim portion of the motor vehicle, having a side facing an interior; and
   a comfort system, including:
      an assembly having at least two mechanical operator control elements with an end face of the assembly of the comfort system that is visible to a user being in a different plane than the side of the interior trim portion, and an operator control device for the comfort system, including a touch-sensitive screen having a control panel connecting the two planes, the touch-sensitive screen being configured as a frame element surrounding at least most of the assembly, the control panel configured with an operator control area assigning an operator control function to at least one of the at least two mechanical operator control elements, the operator control area displaying a function triggerable by a respective mechanical operator control element, and the touch-sensitive screen configured to receive an operator control action for changing an association between the function and the respective mechanical operator control element to another function triggerable by the respective mechanical operator control element and the respective mechanical operator control element.

9. The motor vehicle as claimed in claim 8, wherein the assembly is one of retracted in the interior trim portion and protruding from the interior trim portion.

10. The motor vehicle as claimed in claim 8, wherein the assembly is a key bar.

11. The motor vehicle as claimed in claim 10, wherein the touch-sensitive screen is configured as a volumetric screen and/or volume screen and/or as a screen having an alterable shape and/or has a curved and/or domed surface.

12. The motor vehicle as claimed in claim 11, wherein the touch-sensitive screen is configured as a ring display.

13. The motor vehicle as claimed in claim 10, wherein the touch-sensitive screen is configured as a ring display.

14. The motor vehicle as claimed in claim 8, wherein the touch-sensitive screen is configured as a volumetric screen and/or volume screen and/or as a screen having an alterable shape and/or has a curved and/or domed surface.

15. The motor vehicle as claimed in claim 8, wherein the touch-sensitive screen is configured as a ring display.

* * * * *